United States Patent
Hsieh et al.

(10) Patent No.: US 12,185,276 B2
(45) Date of Patent: Dec. 31, 2024

(54) NETWORK-TRIGGERED PAGING FOR MULTI-RADIO DUAL CONNECTIVITY

(71) Applicant: GOOGLE LLC, Mountain View, CA (US)

(72) Inventors: Jing Hsieh, Taipei (TW); Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 354 days.

(21) Appl. No.: 17/633,470

(22) PCT Filed: Aug. 4, 2020

(86) PCT No.: PCT/US2020/044821
§ 371 (c)(1),
(2) Date: Feb. 7, 2022

(87) PCT Pub. No.: WO2021/026114
PCT Pub. Date: Feb. 11, 2021

(65) Prior Publication Data
US 2022/0287002 A1  Sep. 8, 2022

Related U.S. Application Data

(60) Provisional application No. 62/884,229, filed on Aug. 8, 2019.

(51) Int. Cl.
*H04W 68/02* (2009.01)
*H04W 68/00* (2009.01)
*H04W 76/27* (2018.01)

(52) U.S. Cl.
CPC ......... *H04W 68/02* (2013.01); *H04W 68/005* (2013.01); *H04W 76/27* (2018.02)

(58) Field of Classification Search
CPC .... H04W 68/02; H04W 76/27; H04W 68/005
See application file for complete search history.

(56) References Cited

U.S. PATENT DOCUMENTS

2018/0270791 A1  9/2018  Park et al.
2018/0270894 A1  9/2018  Park et al.
(Continued)

FOREIGN PATENT DOCUMENTS

CN  105659692 A  6/2016
CN  110089194 A  8/2019
(Continued)

OTHER PUBLICATIONS

International Preliminary Report on Patentability for Application No. PCT/US2020/044821, dated Jun. 8, 2021.
(Continued)

*Primary Examiner* — Yemane Mesfin
*Assistant Examiner* — Salma Ayad
(74) *Attorney, Agent, or Firm* — MARSHALL, GERSTEIN & BORUN LLP (57) ABSTRACT

A secondary node (SN) for requesting a master node (MN) to page a user equipment (UE) operating in dual connectivity (DC) with the MN and the SN receives, from a core network (CN), downlink traffic for the UE in an inactive state of a protocol for controlling radio resources, the inactive state being associated with a suspended radio connection between the UE and a radio access network (RAN) (802), and transmits, to the MN, a message that causes the MN to initiate RAN paging of the UE (804).

8 Claims, 10 Drawing Sheets

(56) References Cited

U.S. PATENT DOCUMENTS

| | | |
|---|---|---|
| 2018/0368196 A1 | 12/2018 | Gage |
| 2019/0174366 A1 | 6/2019 | Susitaival et al. |
| 2019/0215748 A1 | 7/2019 | Zhang |
| 2020/0146089 A1* | 5/2020 | Li .................... H04L 5/0098 |
| 2020/0169922 A1* | 5/2020 | Ozturk .............. H04W 76/15 |
| 2020/0178208 A1* | 6/2020 | Kim .................. H04W 76/15 |
| 2020/0205123 A1* | 6/2020 | Byun ................ H04W 76/27 |
| 2020/0214073 A1* | 7/2020 | Shimoda .......... H04W 76/15 |
| 2020/0288338 A1* | 9/2020 | Freda ................ H04W 76/19 |
| 2020/0374320 A1 | 11/2020 | Li |
| 2021/0168896 A1 | 6/2021 | Wang |
| 2021/0385897 A1 | 12/2021 | Purkayastha |
| 2022/0039186 A1 | 2/2022 | Ozturk |
| 2022/0287133 A1 | 9/2022 | Hsieh |

FOREIGN PATENT DOCUMENTS

| | | | |
|---|---|---|---|
| EP | 2 645 803 A1 | 10/2013 | |
| JP | 2019-083563 A | 5/2019 | |
| KR | 2015-0035358 A | 4/2015 | |
| WO | WO-2016/138937 A1 | 9/2016 | |
| WO | WO-2018/174791 A1 | 9/2018 | |
| WO | WO-2018/228451 A1 | 12/2018 | |
| WO | WO-2018/232124 A1 | 12/2018 | |
| WO | WO-2019/022531 A1 | 1/2019 | |
| WO | WO-2019011057 A1 * | 1/2019 | ........... H04L 5/0098 |
| WO | WO-2019/031827 A1 | 2/2019 | |
| WO | WO-2019/064114 A1 | 4/2019 | |
| WO | WO-2019/099550 A1 | 5/2019 | |
| WO | WO-2020/065622 A1 | 4/2020 | |
| WO | WO-2020/167170 A1 | 8/2020 | |
| WO | WO-2020/197474 A1 | 10/2020 | |
| WO | WO-2020/231104 A1 | 11/2020 | |

OTHER PUBLICATIONS

International Search Report and Written Opinion for Application No. PCT/US2020/044821, dated Nov. 2, 2020.
Qualcomm Inc., "RRC_Inactive with MR_DC," 3GPP Draft (2018).
3GPP TS 38.423 v15.3.0, "3rd Generation Partnership Project; Technical Specification Group Radio Access Network; NG-RAN; Xn application protocol (XnAP) (Release 15)" (2019).
"5G; NR; Overall Description; Stage-2," 3GPP TS 38.300 version 15.5.0 Release 15 (2019).
"5G; NR; Radio Resource Control (RRC0; Protocol Specification," 3GPP TS 38.331 version 15.4.0 Release 15 (2019).
"Universal Mobile Telecommunications System (UMTS); LTE; 5G; NR; Multi-Connectivity; Overall Description; Stage-2," 3GPP TS 37.340 version 15.4.0 Release 15 (2019).
"LTE; Evolved Universal Terrestrial Radio Access (E-UTRA) and Evolved Universal Terrestrial Radio Access Network (E-UTRAN); Overall description; Stage 2 (3GPP TS 36.300 version 14.2.0 Release 14)," ETSI TS 136 300 V14.2.0 (Apr. 2017).
First Office Action for Chinese Application No. 202080067727.5, dated Oct. 17, 2023.
Qualcomm Incorporated, "MR-DC in RRC_Inactive State," 3GPP TSG-RAN2#103bis (2018).
Rapporteur (ZTE Corporation), "Agreements for MR-DC with 5GC," 3GPP TSG-RAN WG2 Meeting #104 (2018).
3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.6.0 (2019).
3rd Generation Partnership Project; Technical Specification Group Radio Access Network; NR; Radio Resource Control (RRC) protocol specification (Release 15), 3GPP TS 38.331 V15.6.0 (2019).
Ericsson, Secondary Node Resume in NE-DC and NN-DV (TP to 38.300), 3GPP TSG-RAN WG2 #103 R2-1811577, 1-6 (Aug. 2018).
First Examination Request for India Application No. 202247011173, dated Jul. 11, 2022.
International Search Report and Written Opinion for Application No. PCT/US2020/044819, dated Oct. 30, 2020.
Office Action for European Patent Application No. 20757785.9, dated Mar. 20, 2023.
Office Action for European Patent Application No. 20757785.9, dated Sep. 20, 2023. .
Office action for Japanese Patent Application No. 2022-507668, mailing date of Apr. 10, 2023.

* cited by examiner

NETWORK-TRIGGERED PAGING FOR MULTI-RADIO DUAL CONNECTIVITY

TECHNICAL FIELD

This disclosure relates generally to wireless communications and, more particularly, to paging a communication device.

BACKGROUND

A user device (or user equipment, commonly denoted by acronym "UE") in some cases can concurrently utilize resources of multiple network nodes, e.g., base stations, interconnected by a backhaul. When these network nodes support the same radio access technology (RAT), or different RATs, this type of connectivity is referred to as Dual Connectivity (DC), or Multi-Radio DC (MR-DC), respectively. When a UE operates in DC or MR-DC, one base station operates as a master node (MN), and the other base station operates as a secondary node (SN). The backhaul can support an Xn interface, for example.

The MN can provide a control plane connection and a user plane connection to a core network (CN), whereas the SN generally provides a user plane connection. The cells associated with the MN define a master cell group (MCG), and the cells associated with the SN define a secondary cell group (SCG). The UE and the base stations MN and SN can use signaling radio bearers (SRBs) to exchange radio resource control (RRC) messages, as well as non-access stratum (NAS) messages. There are several types of SRBs that a UE can use when operating in DC. SRB1 and SRB2 resources allow the UE and the MN to exchange RRC messages related to the MN, and to embed RRC messages related to the SN, and can be referred to as MCG SRBs. SRB3 resources allow the UE and the SN to exchange RRC messages related to the SN, and can be referred to as an SCG SRB. Split SRBs allow the UE to exchange RRC messages directly with the MN by using radio resources of the MN, the SN, or both of the MN and SN. Further, the UE and the base stations MN and SN use data radio bearers (DRBs) to transport data on a user plane. DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of both the MN and the SN can be referred to as split DRBs.

A base station (e.g., MN, SN) and/or the CN in some cases causes the UE to transition from one state of the Radio Resource Control (RRC) protocol to another state. More particularly, the UE can operate in an idle state (e.g., EUTRA-RRC_IDLE, NR-RRC IDLE), in which the UE does not have an active radio connection with a base station; a connected state (e.g., EUTRA-RRC_CONNECTED, NR-RRC CONNECTED), in which the UE has a radio connection with the base station; or an inactive state (e.g., EUTRA-RRC INACTIVE, NR-RRC INACTIVE), in which the UE has a suspended radio connection with the base station.

A network event (e.g., incoming downlink user plane data or downlink signaling) from the CN may require an SN to send a request message to an MN to page a UE when the UE is in an inactive RRC state (e.g., RRC_INACTIVE). Generally speaking, in the inactive RRC state, the radio connection between the UE and the radio access network (RAN) is suspended. Because the XnAP RAN Paging message in TS 38.423 v15.3.0 requires information the SN does not possess at least in some scenarios, such as UE RAN paging identity, paging DRX, or RAN paging area, the SN cannot trigger the MN to page the UE.

SUMMARY

According to the techniques of this disclosure, an SN receives downlink traffic for a UE, such as data and/or signaling, and triggers paging of the UE by transmitting a message to the MN. The UE operates in the inactive state, and the MN and the SN in these scenarios can be the old MN and the old SN, respectively, with which the UE communicated in DC prior to transitioning from the connected state to the inactive state.

In some implementations, the SN can receive the required paging information from the MN in a request message (e.g., SN Modification Request message) before the MN causes the UE to transition to the inactive state. The SN can then trigger the MN to page the UE by sending a RAN Paging message to the MN, with the required paging information. The paging information can include for example one or more of a UE identity index value, UE RAN Paging Identity, Paging Discontinuous Reception (DRX), or the RAN paging area.

In some implementations, the SN uses an XnAP RAN Paging message and includes in the message an MN UE XnAP ID (e.g., a M-NG-RAN node UE XnAP ID) and an SN UE XnAP ID (e.g., S-NG-RAN node UE XnAP ID). The SN can trigger the MN to page the UE by sending the XnAP RAN Paging message to the MN. Using this ID (or these IDs), the MN can retrieve the paging information, which can be stored locally at the MN, and initiate the paging procedure of the UE.

In some implementations, the SN can trigger the MN to page the UE by sending an Activity Notification message including a "re-activated" field to the MN.

In some implementations, the SN can trigger the MN to page the UE by sending an SN Modification Required message including a "paging required" field to the MN.

An example embodiment of these techniques is a method in an SN for paging a UE operating in DC with an MN and the SN, which the SN can execute using processing hardware. The method includes receiving, from a CN, downlink traffic for the UE in an inactive state of a protocol for controlling radio resources, the inactive state being associated with a suspended radio connection between the UE and a radio access network (RAN). The method further includes transmitting, to the MN, a message that causes the MN to initiate RAN paging of the UE.

Another example embodiment of these techniques is an SN with processing hardware configured to implement the method above.

Another example embodiment of these techniques is a method in an MN for paging a UE operating in DC with the MN and an SN, which the MN can execute using processing hardware. The method includes receiving, from the SN, a message to cause the MN to initiate RAN paging of the UE operating in an inactive state of a protocol for controlling radio resources, the inactive state being associated with a suspended radio connection between the UE and a radio access network. The method further includes initiating the RAN paging of the UE using at least one of (i) paging information included in the received message or (ii) paging information stored at the MN and identified based on the received message.

Another example embodiment of these techniques is an MN with processing hardware configured to implement the method above.

DETAILED DESCRIPTION OF THE DRAWINGS

Figure 1A:
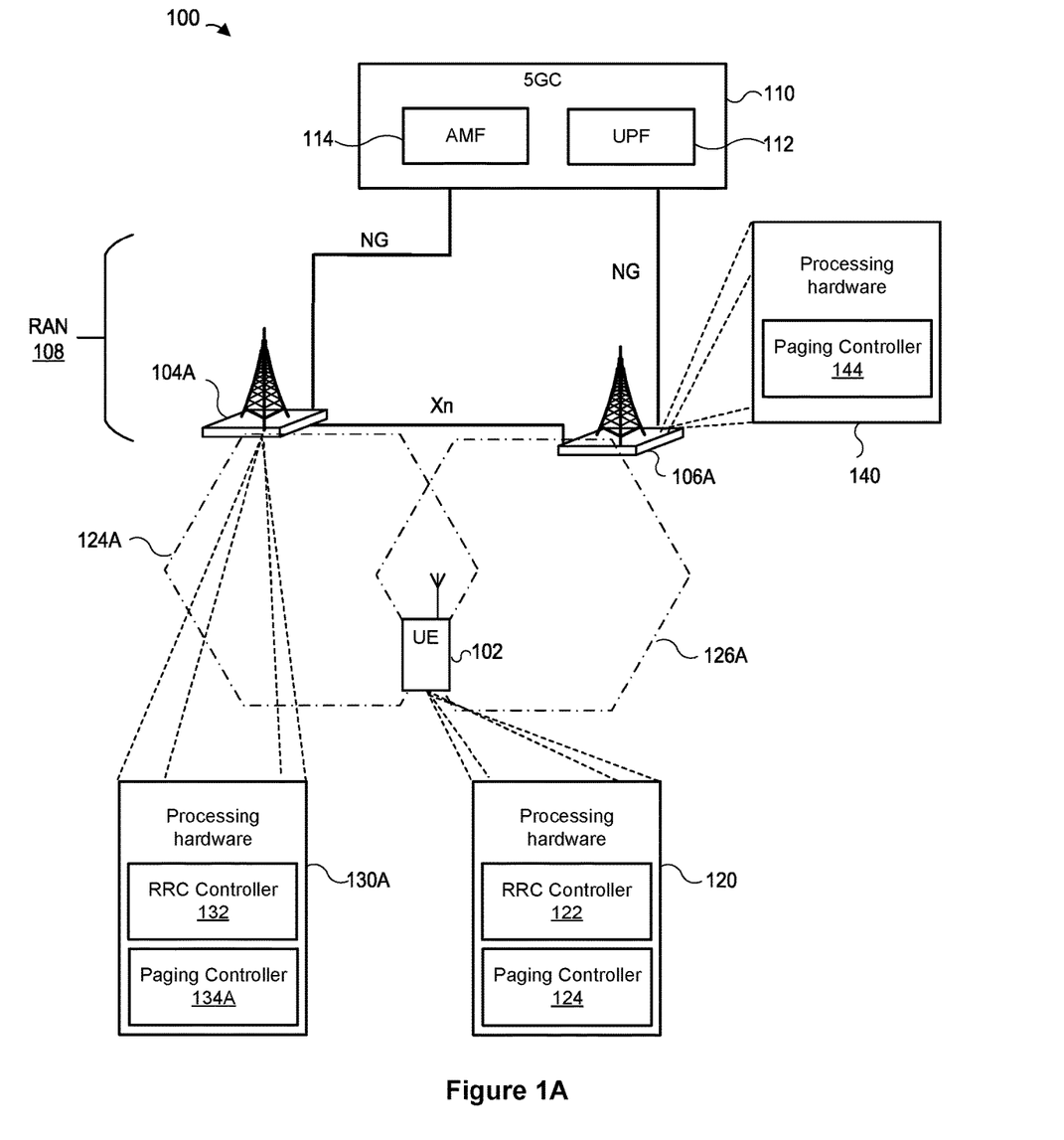
FIGS. 1A and 1B are block diagrams of example systems in which one or more base stations can implement the techniques of this disclosure for paging a UE.

FIG. 1A depicts an example wireless communication system 100 in which a UE 102 operates in DC with an MN 104A and an SN 106A of a RAN 108 and, after the UE 102 transitions to an inactive state, the SN 106A initiates a paging procedure to cause the MN 104A to initiate RAN paging of the UE 102 using the techniques of this disclosure.

In different configurations of the wireless communication system 100, the MN 104A can be implemented as a master eNB (MeNB) or a master gNB (MgNB) node, an SN 106A can be implemented as a secondary eNB (SeNB) or a secondary gNB (SgNB) node, and the UE 102 communicates with the MN 104A and SN 106A via the same RAT such as EUTRA or NR, or different RATs. In some cases, the MeNB or SeNB is implemented as an ng-eNB rather than an eNB. In any case, the MN 104A and the SN 106A can connect to a CN 110, which can be for example a 5G core network (5GC) or an evolved packet core (EPC). The MN 104A and the SN 106A accordingly can support an S1 interface to communicate with an EPC or NG interface to communicate with a 5GC. Further, to directly exchange messages during the scenarios discussed below, the MN 104A and the SN 106A can support an Xn interface.

As illustrated in FIG. 1A, the MN 104A supports a cell 124A, and the SN 106A supports a cell 126A. The cells 124A and 126A can partially overlap, so that the UE 102 can communicate in DC with the MN 104A and the SN 106A (throughout the disclosure, "DC" refers to both single-radio or MR-DC). In general, the RAN 108 can include any suitable number of base stations supporting the cells 124A and 126A, and an example configuration in which the CN 110 is connected to additional base stations is discussed below with reference to FIG. 1B.

In the example configuration of FIG. 1A, the CN 110 is a 5GC. Among other components, the 5GC 110 includes a User Plane Function (UPF) 112 and an Access and Mobility Management Function (AMF) 114. Generally speaking, the UPF 112 is configured to communicate user-plane packets related to audio calls, video calls, Internet traffic, etc., and the AMF 114 is configured to manage mobility management, authentication, registration, paging, and other related functions.

Although the examples below refer specifically to a 5GC and specific RAT types, 5G NR and EUTRA, in general the techniques of this disclosure also can apply to other suitable core network types and/or radio access technologies.

The SN 106A is equipped with processing hardware 140 that can include one or more general-purpose processors such as CPUs and non-transitory computer-readable memory storing machine-readable instructions executable on the one or more general-purpose processors, and/or special-purpose processing units. The processing hardware 140 in an example implementation includes a paging controller 144 configured to communicate paging-related information with the MN 104A, which in turn sends a paging message to the UE 102. The MN 104A is equipped with processing hardware 130A that can also include one or more general-purpose processors such as CPUs and non-transitory computer-readable memory storing machine-readable instructions executable on the one or more general-purpose processors, and/or special-purpose processing units. The processing hardware 130A in an example implementation includes an RRC controller 132 configured to provide the UE 102 with resources to change the state of the UE 102 from a connected state to an inactive state, and a paging controller 134A configured to receive paging-related information from the SN 106A to page the UE 102. In general, because a base station can operate as an MN or an SN in different scenarios, the paging controllers 134A and 144 can implement similar sets of functions and support both MN and SN operations.

The UE 102 is equipped with processing hardware 120 that can include one or more general-purpose processors such as CPUs and non-transitory computer-readable memory storing machine-readable instructions executable on the one or more general-purpose processors, and/or special-purpose processing units. The processing hardware 120 in an example implementation includes an RRC controller 132 configured to change the state of the UE 102 from connected to inactive, and a paging controller 124 configured to receive a paging message from the MN 104A.

Figure 1B:
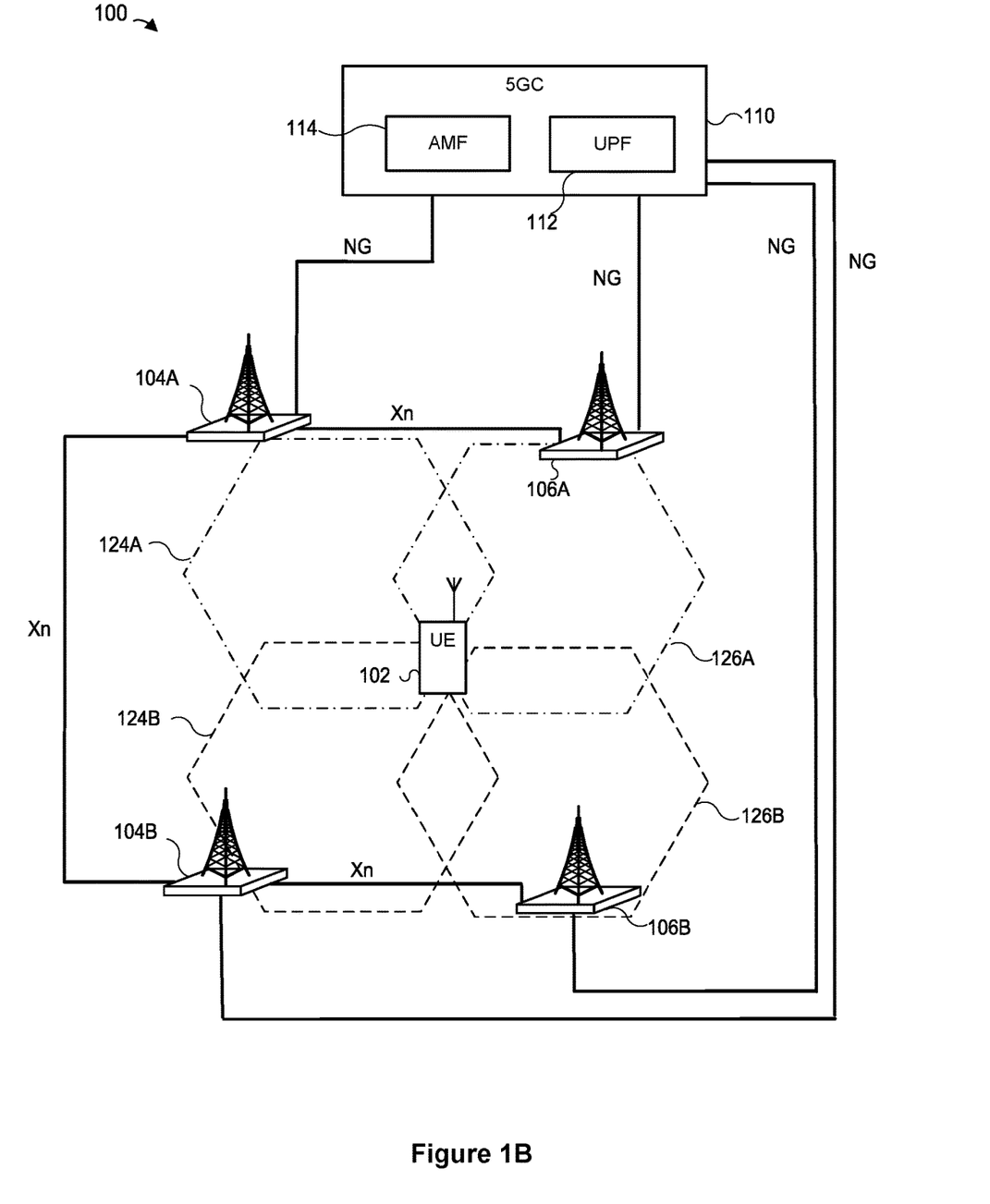

FIG. 1B illustrates another implementation of the network 100, where the CN 110 connects to an MN 104B and an SN 106B in addition to the MN 104A and the SN 106A. Although not shown to avoid clutter, each of the MN 104B and the SN 106B is equipped with processing hardware that includes a paging controller similar to the paging controller 134A or 144. The MN 104B supports a cell 124B, and the SN 106B supports a cell 126B. The MNs 104A and 104B can support an inter-MN handover, so that the UE 102 can continue operating in DC after releasing a connection with the MN 104A and selecting the cell 124B of the MN 104B, for example.

Several example scenarios in which the base stations operating in the system of FIG. 1A or 1B page the UE 102 are discussed next with reference to FIGS. 2-7.

Figure 2:
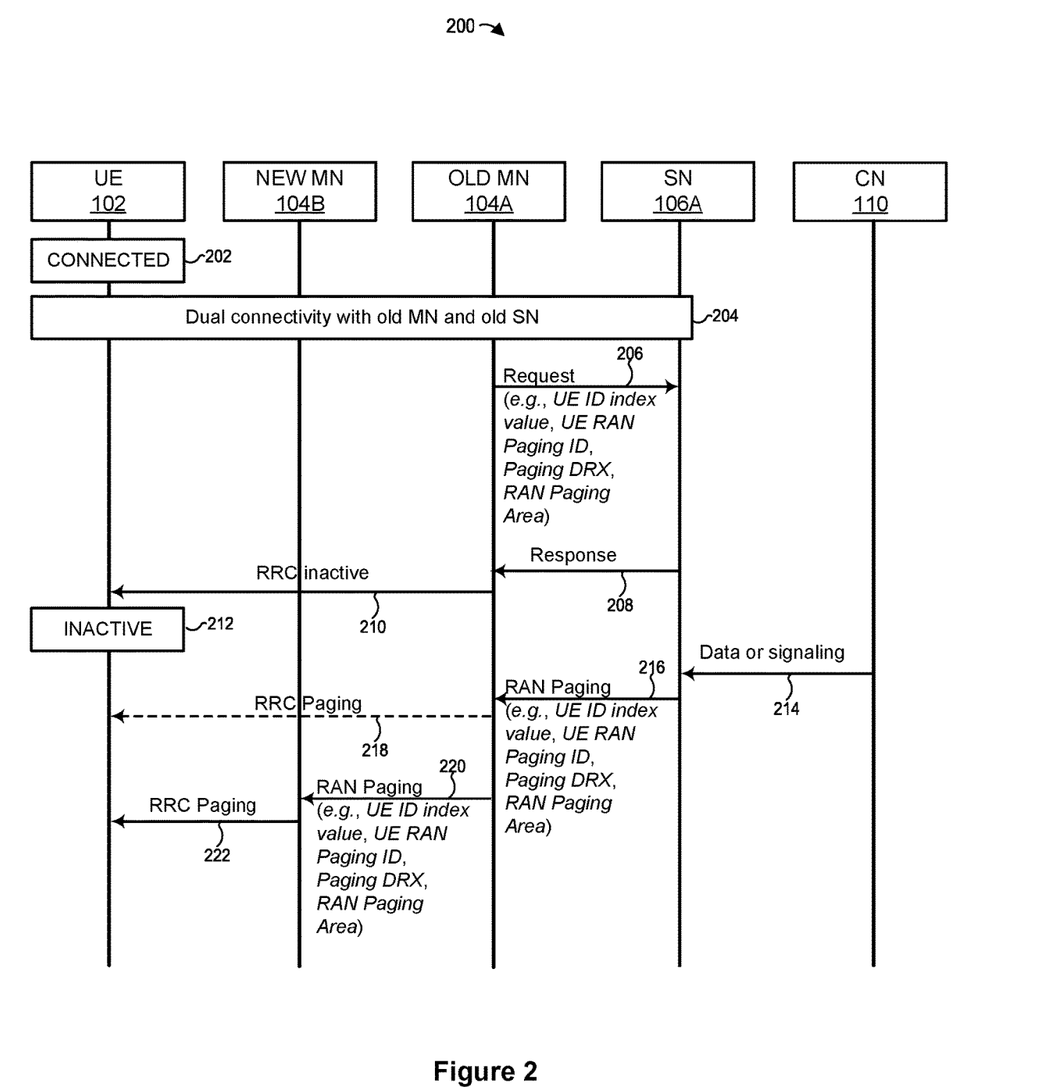
FIG. 2 is a messaging diagram of an example scenario in which the SN of FIGS. 1A and B initiates a paging procedure when a UE is in an inactive state, in accordance with the techniques of this disclosure.

First referring to FIG. 2, at the beginning of a scenario 200, the UE 102 operates 202 in a connected state (e.g., EUTRA-RRC_CONNECTED, NR-RRC CONNECTED) with the RAN 108 (e.g., the SN 106A and the MN 104A). The SN 106A provides the UE 102 with a DRB terminated at the SN 106A, i.e., an SN-terminated DRB, so that the UE 102 is configured to communicate data with the SN 106A via the SN-terminated DRB and radio resources of the SN 106A. The MN 104A can also provide the UE 102 with a DRB terminated at the MN 104A, i.e., an MN-terminated DRB. Accordingly, MN 104A and SN 106A thus support 204 DC at the UE 102.

To configure the SN-terminated DRB so that the UE 102 can communicate with the SN 106A, the SN 106A sends higher-layer DC configuration to the MN 104A, which in turn transmits the higher-layer DC configuration to the UE 102, in one implementation. The higher-layer DC configuration can be a radio bearer configuration (RadioBearerConfig Information Element (IE)), a DRB-ToAddModList IE, or a DRB-ToAddMod IE, which configures the SN-terminated DRB.

In another implementation, the SN 106A sends lower-layer DC configuration to the MN 104A, which in turn transmits the lower-layer DC configuration to the UE 102. The lower-layer DC configuration can configure a medium access control (MAC) entity, a logical channel with an associated radio link control (RLC) entity, and a primary secondary cell (PSCell). The lower-layer DC configuration can be a CellGroupConfig IE of an SCG (e.g., the cell 126A). The SN 106A can optionally update the lower-layer DC configuration to the UE 102 via the radio resources (e.g., SRB3) of the SN 106A or via radio resources of the MN 104A (e.g., SRB1).

In some implementations, the MN 104A stores a UE context for the UE 102 (e.g., the "UE Context" as defined by the 5G specification). The MN 104A communicates with the UE 102 according to the UE context while the UE 102 is in the connected state. For example, the UE context can include a security key, a configuration for an MCG (e.g., the cell 124A), a radio bearer configuration configuring an MN-terminated bearer, the higher-layer DC configuration, and/or the lower-layer DC configuration.

Similarly, in some implementations, the SN 106A stores a UE context for the UE 102, which can include the higher-layer DC configuration and/or the lower-layer DC configuration discussed above. The SN 106A communicates with the UE 102 according to the UE context while the UE 102 is in the connected state.

The SN 106A can receive required paging information prior to the MN 104A causing the UE 102 to transition from the connected state to an inactive state, so that the SN 106A can send the required paging information to the MN 104A and trigger the MN 104A to page the UE 102, when the UE 102 is in the inactive state. The SN 106A can receive the required paging information from the MN 104A via the Xn interface. In another implementation, however, the SN 106A can receive the required paging information from the CN 110.

Before the MN 104A configures (when necessary) the UE 102 with resources to change its state from the connected state to the inactive state, the RRC controller 132 of the MN 104A transmits 206 a request message (e.g., SN Modification Request) to the SN 106A and receives 208 a response message (e.g., SN Modification Request Acknowledge) from the SN 106A. The request message informs the SN 106A that the UE 102 will be configured to change its state from the connected state to the inactive state. In some implementations, the RRC controller 132 includes UE Identity Index Value, UE RAN Paging Identity, Paging Discontinuous Reception (DRX), or RAN Paging Area in the request message to inform the SN 106 with required paging information for use by the SN 106A, so that when the SN 106A determines to request that the MN 104A page the UE 102, the paging controller 144 of the SN 106A can send a RAN Paging message to the MN 104A with the required paging information.

If the MN 104A determines there is no data activity associated with the UE 102 (no traffic to or from the UE 102), the RRC controller 132 transmits 210 an RRC inactive message to cause the UE 102 to change its state from the connected state to the inactive state. In some implementations, the RRC inactive message is an RRCRelease message if the MN 104A is a gNB. In other implementations, the RRC inactive message is an RRCConnectionRelease message if the MN 104A is an ng-eNB.

In some implementations, before the MN 104A transmits 210 the RRC inactive message, the RRC controller 132 can send an SN Modification Request message (e.g., S-Node Modification Request message) to the SN 106A, which in turn can release the lower-layer DC configuration or stop communicating with the UE 102 via radio resources of the SN 106A. In response, the SN 106A can send an SN Modification Request Acknowledge message (e.g., S-Node Modification Request Acknowledge message) to the MN 104A.

With continued reference to FIG. 2, upon receiving the RRC inactive message, the UE 102 transitions 212 to the inactive state from the connected state. While the UE 102 remains in the inactive state, a trigger event may occur, such as when the SN 106A receives 214 downlink traffic (e.g., user plane data, downlink signaling) from the CN 110.

In response, because the SN 106A has already received required paging information (e.g., UE Identity Index Value, UE RAN Paging Identity, Paging DRX, or RAN Paging Area) from the MN 104A in event 206, the paging controller 144 of the SN 106A can include the required paging information in a RAN Paging message and send 216 the RAN Paging message to the paging controller 134A of the MN 104A. In turn, the paging controller 134A can send 218 an RRC Paging message to the paging controller 124 of the UE 102 on a channel the UE 102 monitors if the UE 102 stays in coverage of the MN 104A. In some implementations, the paging controller 134A includes the UE RAN Paging Identity in the RRC Paging message and transmits 218 the RRC Paging message on the channel according to the Paging DRX. In one implementation, the UE RAN Paging Identity is an Inactive Radio Network Temporary Identifier (I-RNTI) assigned to the UE 102 in the RRC inactive message of event 210.

In some implementations, if an additional MN (e.g., MN 104B) is configured in the same RAN notification area as MN 104A, the paging controller 134A can send 220 the RAN Paging message to the paging controller 134B of the MN 104B. The paging controller 134B then sends 222 an RRC Paging message to the UE 102 on a channel the UE 102 monitors if the UE 102 stays in coverage of the MN 104B. In some implementations, the paging controller 134B includes the UE RAN Paging Identity in the RRC Paging message and transmits 222 the RRC Paging message on the channel according to the Paging DRX. In one implementation, the UE RAN Paging Identity is the I-RNTI.

Figure 3:
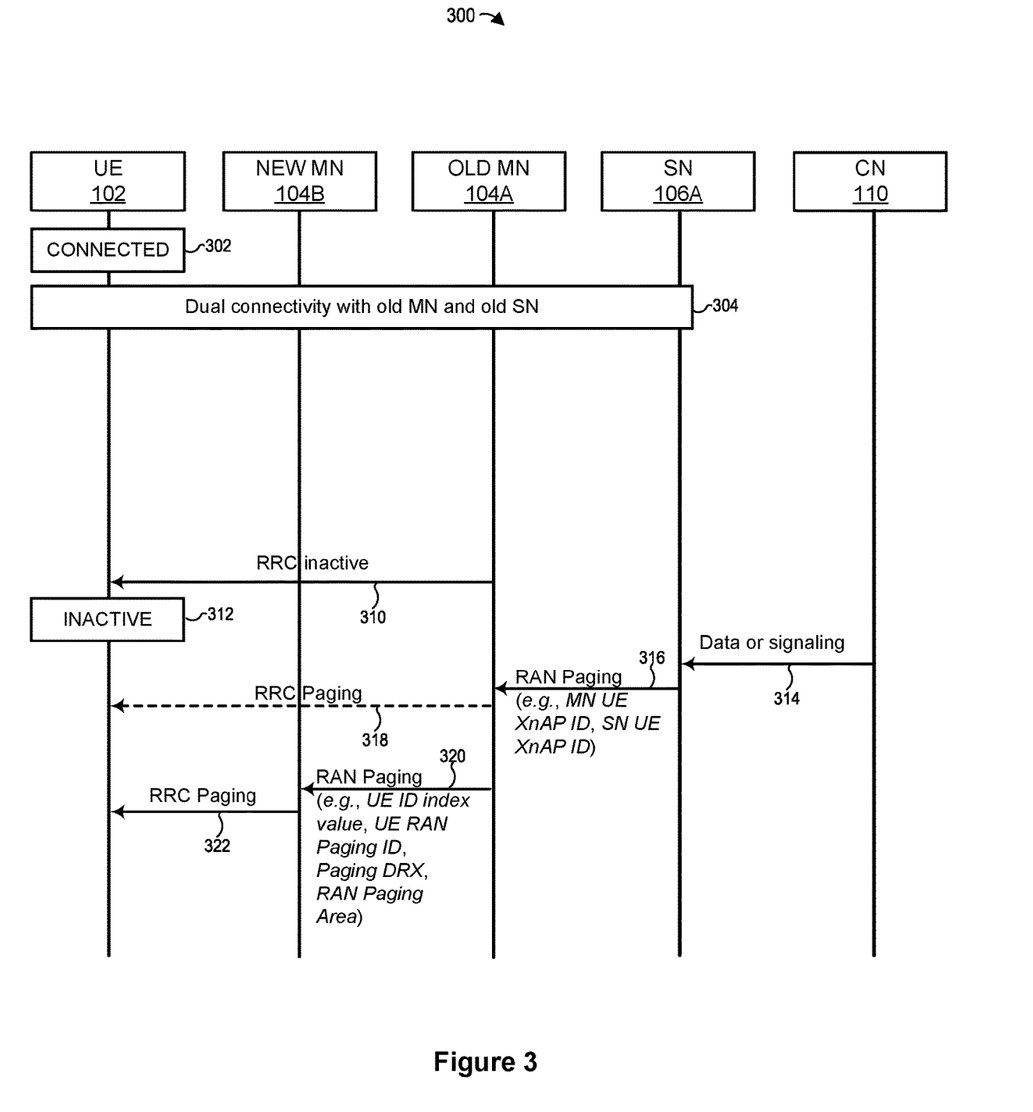
FIG. 3 is a messaging diagram of an example scenario in which the SN of FIG. 1A or 1B initiates a paging procedure using a RAN Paging message when the UE is in an inactive state, in accordance with the techniques of this disclosure.

Now referring to FIG. 3, at the beginning of a scenario 300, the UE 102 operates 302 in a connected state with the RAN 108 (e.g., the SN 106A and the MN 104A), similar to event 202 in the scenario of FIG. 2. Also similar to event 204 of FIG. 2, the MN 104A and the SN 106A support 304 DC at the UE 102.

If the MN 104A determines there is no data activity associated with the UE 102, the RRC controller 132 of the MN 104A transmits 310 an RRC inactive message to cause the UE 102 to change its state from the connected state to the inactive state, similar to event 210 in the scenario of FIG. 2.

Upon receiving 310 the RRC inactive message, the UE 102 enters 312 the inactive state from the connected state, similar to event 212 in the scenario of FIG. 2. While the UE 102 remains in the inactive state, a trigger event may occur, such as when the SN 106A receives 314 downlink traffic from the CN 110, similar to event 214 in the scenario of FIG. 2. As discussed in further detail below, the SN 106A can include an identifier in a paging message and send the paging message to the MN 104A, and the MN 104A can use the identifier to retrieve paging information to initiate the paging procedure of the UE 102.

In response receiving 314 downlink traffic, the paging controller 144 of the SN 106A can include an MN UE XnAP ID (e.g., an M-NG-RAN node UE XnAP ID) and an SN UE Xn APID (e.g., S-NG-RAN node UE XnAP ID) in an XnAP RAN Paging message and send 316 the XnAP RAN Paging message to the MN 104A. In some implementations, the MN 104A can optionally include information (e.g., UE Identity Index Value, UE RAN Paging Identity, Paging DRX, or RAN Paging Area) that would have been required paging information in lieu of the MN UE XnAP ID and SN UE Xn APID in the XnAP RAN Paging message.

In response to the XnAP RAN Paging message, the paging controller 134A of the MN 104A can send 318 an RRC Paging message to the paging controller 124 of the UE 102 on a channel the UE 102 monitors if the UE 102 stays in coverage of the MN 104A. In some implementations, the paging controller 134A includes the UE RAN Paging Identity in the RRC Paging message and transmits 318 the RRC Paging message on the channel according to the Paging DRX. In one implementation, the UE RAN Paging Identity is an I-RNTI assigned to the UE 102 in the RRC inactive message of event 310.

In some implementations, if an additional MN (e.g., MN 104B) is configured in the same RAN notification area as MN 104A, the MN 104A can send 320 the XnAP RAN Paging message to the paging controller 134B of the MN 104B. The paging controller 134B then sends 322 an RRC Paging message to the UE 102 on a channel the UE 102 monitors if the UE 102 stays in coverage of the MN 104B. In some implementations, the paging controller 134B includes the UE RAN Paging Identity in the RRC Paging message and transmits 322 the RRC Paging message on the channel according to the Paging DRX. In one implementation, the UE RAN Paging Identity is the I-RNTI.

Figure 4:
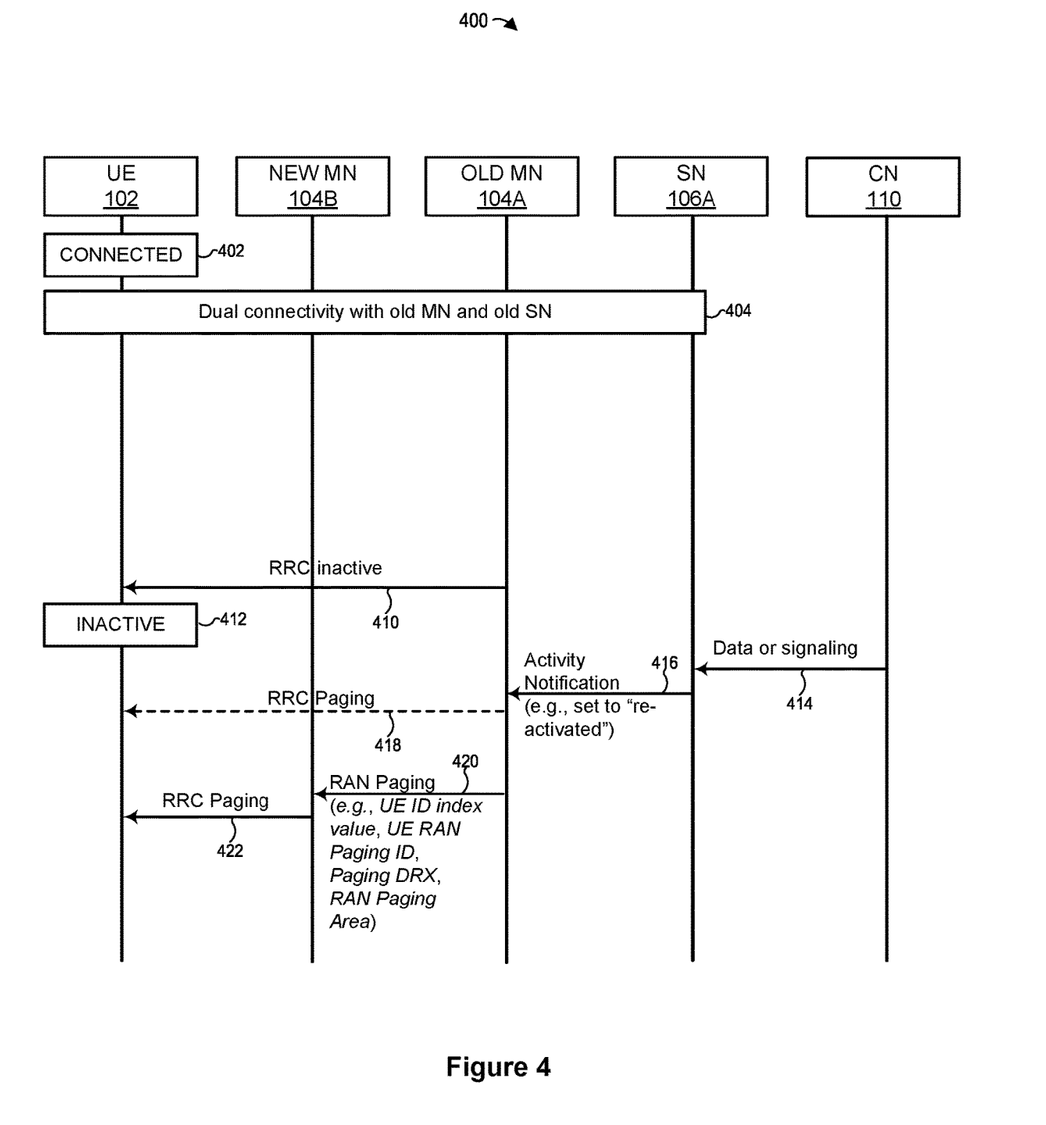
FIG. 4 is a messaging diagram of an example scenario in which the SN of FIG. 1A or 1B initiates a paging procedure using an Activity Notification message when the UE is in an inactive state, in accordance with the techniques of this disclosure.

Now referring to FIG. 4, at the beginning of a scenario 400, the UE 102 operates 402 in a connected state with the RAN 108 (e.g., the SN 106A and the MN 104A), similar to events 202 and 302 discussed above. Also similar to events 204 and 304 discussed above, the MN 104A and the SN 106A support 404 DC at the UE 102.

If the MN 104A determines there is no data activity associated with the UE 102, the RRC controller 132 of the MN 104A transmits 410 an RRC inactive message to cause the UE 102 to change the state of the UE 102 from connected to inactive, similar to events 210 and 310 discussed above.

Upon the RRC controller 122 receiving the RRC inactive message, the UE 102 transitions 412 to the inactive state from the connected state, similar to events 212 and 312 discussed above. While the UE 102 remains in the inactive state, a trigger event may occur, such as when the SN 106A receives 414 downlink traffic from the CN 110, similar to events 214 and 314 as discussed above. As discussed in further detail below, the SN 106A can include an indication that the traffic activity for UE 102 is "re-activated" in an Activity Notification message and send the Activity Notification message to the MN 104A, and the MN 104A can initiate the paging procedure of the UE 102 in response to the Activity Notification message.

In response to receiving 414 downlink traffic, the paging controller 144 of the SN 106A can include a "re-activated" indicator in an Activity Notification message (e.g., Activity Notification in TS 38.423) and send 416 the Activity Notification message to the MN 104A.

In response to the Activity Notification message, the paging controller 134A of the MN 104A can send 418 an RRC Paging message to the paging controller 124 of the UE 102 on a channel the UE 102 monitors if the UE 102 stays in coverage of the MN 104A. In some implementations, the RRC Paging message can include the I-RNTI assigned to the UE 102 in the RRC inactive message of event 410.

In some implementations, if an additional MN (e.g., MN 104B) is configured in the same RAN notification area as the MN 104A, the MN 104A includes required paging information (e.g., UE Identity Index Value, UE RAN Paging Identity, Paging DRX, or RAN Paging Area) in an Xn RAN Paging message and sends 420 the Xn RAN Paging message to the paging controller 134B of the MN 104B. The paging controller 134B then sends 422 an RRC Paging message to the UE 102 on a channel the UE 102 monitors if the UE 102 stays in coverage of the MN 104B. In some implementations, the paging controller 134B includes the UE RAN Paging Identity in the RRC Paging message and transmits 422 the RRC Paging message on the channel according to the Paging DRX. In one implementation, the UE RAN Paging Identity is the I-RNTI.

Figure 5:
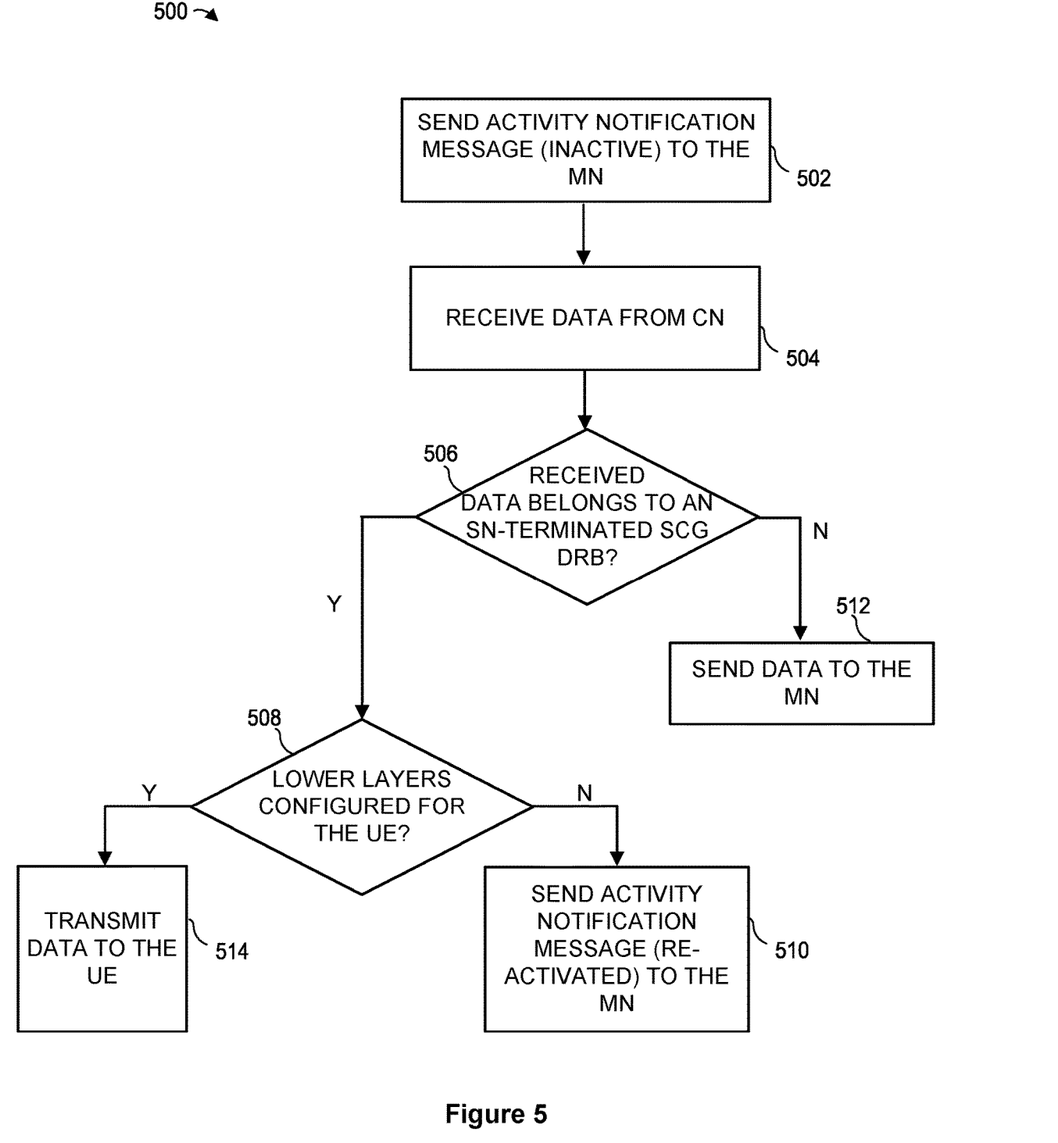
FIG. 5 is a flow diagram of the example method the SN of FIG. 1A or 1B can implement to trigger a paging procedure using an Activity Notification message when the UE is in an inactive state, in accordance with the techniques of this disclosure.

FIG. 5 depicts an example method 500 for triggering a paging procedure using an Activity Notification message when the UE 102 is in an inactive state. The method 500 can be implemented in a base station operating as an SN. For convenience, the method 500 is discussed with reference to the SN 106A.

The method 500 begins at block 502, where the paging controller 144 of the SN 106A can include an "inactive" indicator in an Activity Notification message and send the Activity Notification message to the MN 104A to notify the MN 104A that the UE 102 is inactive for the user plane traffic activity. The SN 106A at block 504 receives data from the CN 110 (e.g., a UPF via an NG interface) after the SN 106A indicates that the UE 102 is inactive in the Activity Notification message. If at block 506 the data received from the CN 110 belongs to an SN-terminated SCG DRB of the UE 102, the SN 106A at block 508 checks if lower layers at the SN 106A are configured for the UE 102 (or for the SN-terminated SCG DRB). If the SN 106A at block 508 does not configure lower layers, i.e., the SN 106A does not allocate radio resources (e.g., RLC, MAC, and physical (PHY) layer resources) at the SN 106 for the UE 102 (or for the SN-terminated SCG DRB), the paging controller 144 at block 510 sends an Activity Notification with a "re-activated" indication to the MN 104A. Otherwise, if the SN 106A at block 508 configures lower layers (i.e., the SN 106A allocates radio resources at the SN 106) for the UE 102, the SN 106A at block 514 sends the data to the UE 102 (or for the SN-terminated SCG DRB). If at block 506 the data received from the CN 110 does not belong to an SN-terminated SCG DRB, the paging controller 144 at block 512 sends the data to the MN 104A. In one implementation, the paging controller 144 sends an Activity Notification with a "re-activated" indication to the MN 104A before sending the data to the MN 104A at block 512. In another implementation, the paging controller 144 at block 512 sends the data to the MN 104A without sending an Activity Notification in advance.

Figure 6:
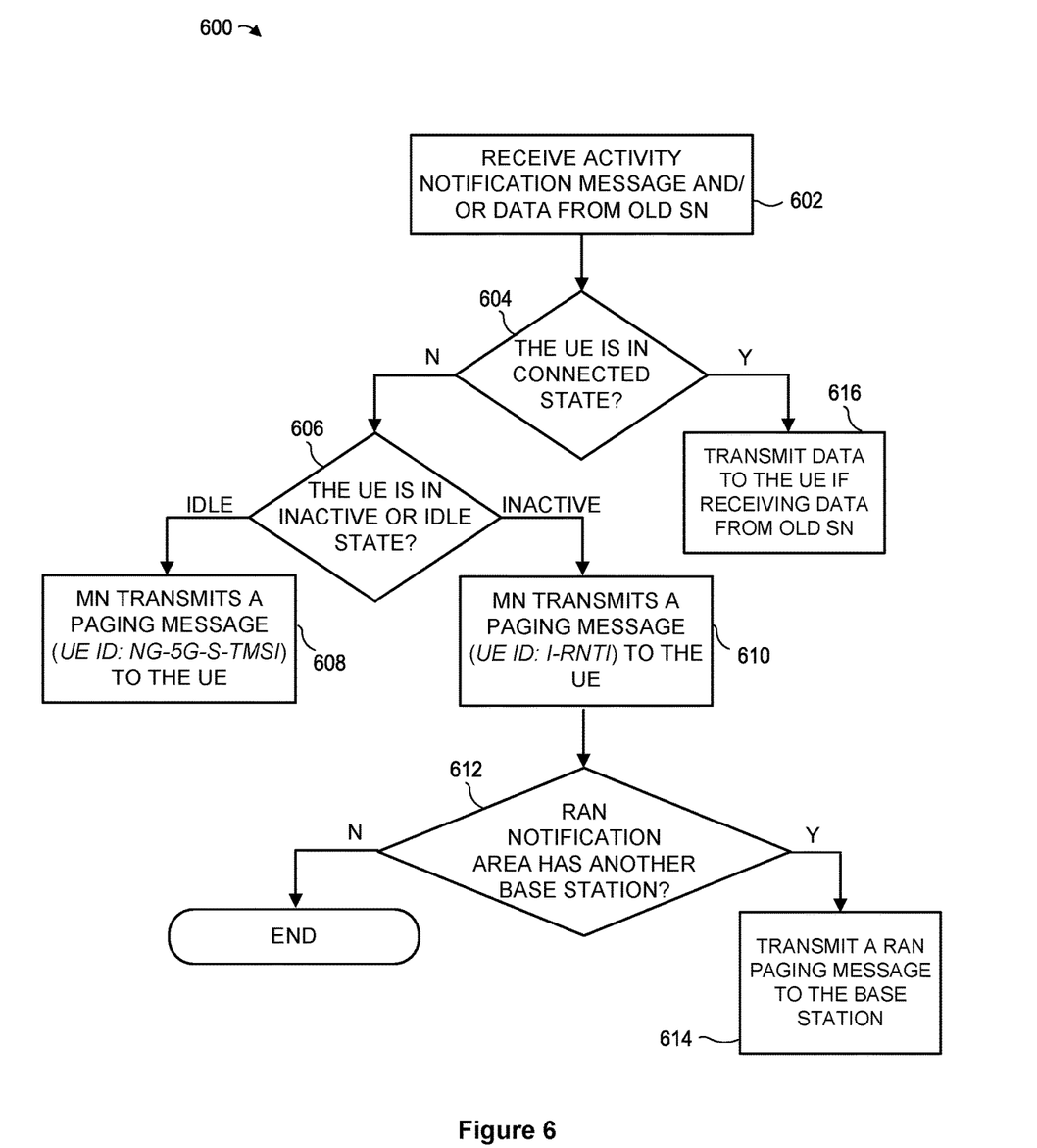
FIG. 6 is a flow diagram of the example method the MN of FIG. 1A or 1B can implement to initiate the paging procedure using an Activity Notification message when the UE is in an inactive state, in accordance with the techniques of this disclosure.

FIG. 6 depicts an example method 600 for initiating the paging procedure using an Activity Notification message when the UE 102 is in the inactive state, which can be implemented in a base station operating as an MN. For convenience, the method 600 is discussed with reference to the MN 104A. Although the method 600 described utilizes an Activity Notification message, the method 600 may be modified to utilize an SN Modification Required message instead of the Activity Notification message, as will be further described in FIG. 7.

The method 600 begins at block 602, where the paging controller 134A of the MN 104A receives the Activity Notification message and/or data from the SN 106A. If the UE 102 at block 604 is in the connected state, the paging controller 134A at block 616 transmits the data if data has been received from the SN 106A. Otherwise, if the UE 102 at block 606 is in an idle state, the paging controller 134A at block 608 transmits an RRC Paging message (e.g., including NG-5G-S-TMSI assigned to the UE 102) to the UE 102. If the UE 102 at block 606 is in the inactive state, the paging controller 134A at block 610 transmits an RRC Paging message to the UE 102. In some implementations, the paging controller 134A at block 610 transmits the RRC Paging message to the UE 102 without determining at block 606 the RRC state of the UE 102. In some implementations, the RRC Paging message includes an I-RNTI assigned to the UE 102. If an additional MN (e.g., MN 104B) is configured in the same RAN notification area as MN 104A at block 612, the paging controller 134A transmits at block 614 an Xn RAN Paging message to the paging controller 134B of the MN 104B, which in turn sends an RRC Paging message to the UE 102. Otherwise, the method 600 ends.

Although the method 600 as illustrated in FIG. 6 completes after blocks 608, 612, 614, and 616, in general the MN 104A can execute the method 600 in an iterative manner, e.g., by "looping back" to block 602 after executing blocks 608, 612, 614, and 616.

Figure 7:
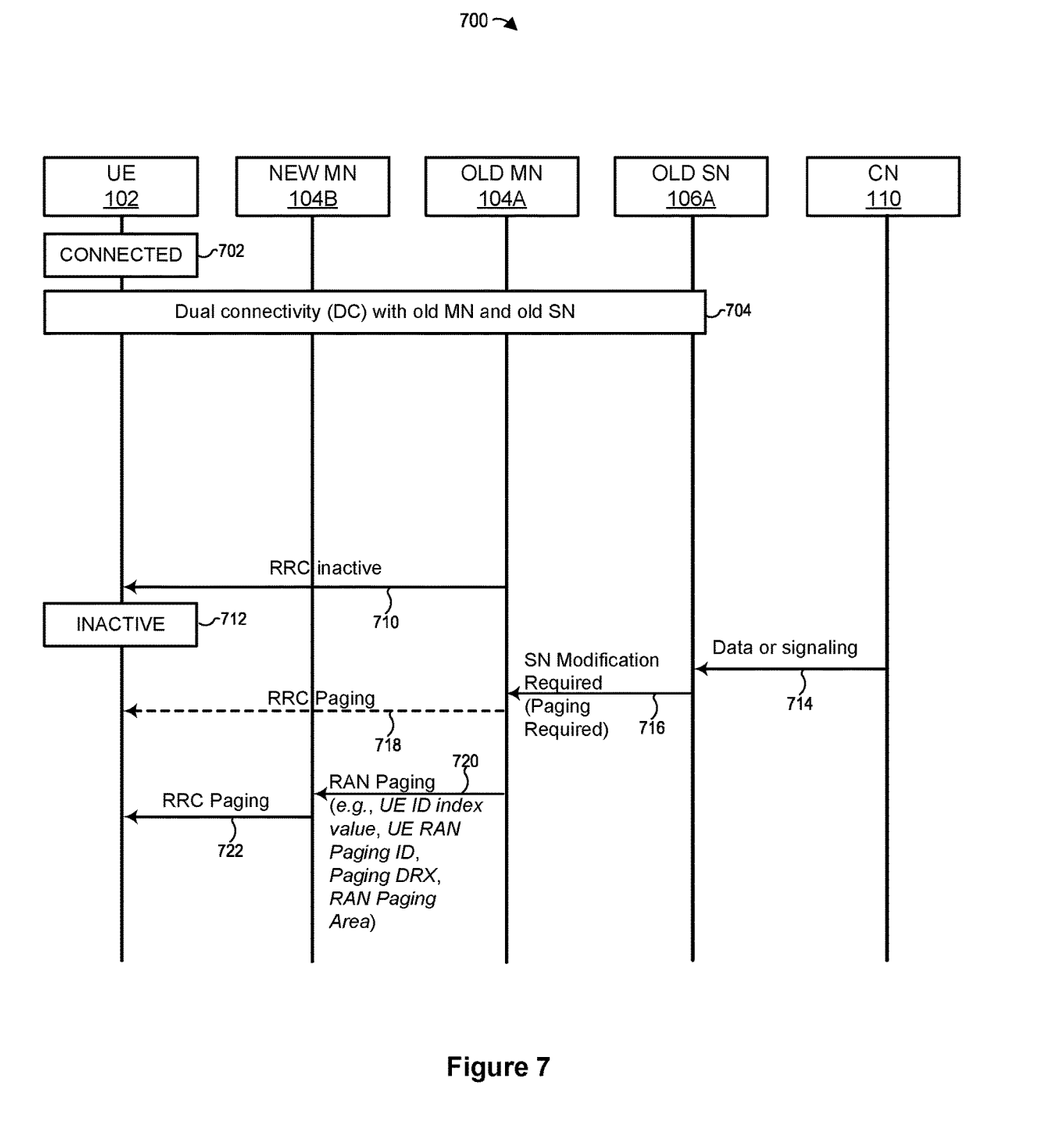
FIG. 7 is a messaging diagram of an example scenario in which the SN initiates a paging procedure using an SN Modification Required message when the UE is in an inactive state, in accordance with the techniques of this disclosure.

Now referring to FIG. 7, at the beginning of a scenario 700, the UE 102 operates 702 in a connected state with the RAN 108 (e.g., the SN 106A and the MN 104A), similar to events 202, 302, and 402 discussed above. Also similar to events 204, 304, and 404 discussed above, the MN 104A and the SN 106A support 404 DC at the UE 102.

If the MN 104A determines there is no data activity associated with the UE 102, the RRC controller 132 of the MN 104A transmits 710 an RRC inactive message to cause the UE 102 to change its state from the connected state to an inactive state, similar to events 210, 310, and 410 discussed above.

Upon the RRC controller 122 receiving the RRC inactive message, the UE 102 transitions 712 to the inactive state from the connected state, similar to events 212, 312, and 412 discussed above. While the UE 102 remains in the inactive state, a trigger event may occur, such as when the SN 106A receives 714 downlink traffic from the CN 110, similar to events 214, 314, and 414 as discussed above. As discussed in further detail below, the SN 106A can include a "Paging Required" field in an SN Modification Required message and send the SN Modification Required message to the MN 104A, and in response, the MN 104A can initiate the paging procedure of the UE 102.

In response to receiving 714 downlink traffic, the paging controller 144 of the SN 106A can include a "Paging Required" field, which may be set to "True," in an SN Modification Required message (e.g., S-Node Modification Required) and send 716 the SN Modification Required message to the MN 104A.

In response to the SN Modification Required message, the paging controller 134A of the MN 104A can send 718 an RRC Paging message to the UE 102 on a channel the UE 102 monitors if the UE 102 stays in coverage of the MN 104A. In some implementations, the RRC Paging message can include the I-RNTI assigned to the UE 102 in the RRC inactive message of event 710.

In some implementations, if an additional MN (e.g., MN 104B) is configured in the same RAN notification area as MN 104A, the MN 104A can include required paging information (e.g., UE Identity Index Value, UE RAN Paging Identity, Paging DRX, or RAN Paging Area) in an Xn RAN Paging message and send 720 the Xn RAN Paging message to the paging controller 134B of the MN 104B. The paging controller 134B then sends 722 an RRC Paging message to the UE 102 on a channel the UE 102 monitors if the UE 102 stays in coverage of the MN 104B. In some implementations, the paging controller 134B includes the UE RAN Paging Identity in the RRC Paging message and transmits 722 the RRC Paging message on the channel according to the Paging DRX. In one implementation, the UE RAN Paging Identity is the I-RNTI assigned to the UE 102 in the RRC inactive message of event 710.

If either the MN 104A or MN 104B successfully pages the UE 102, such as by sending the RRC Paging message to the UE 102 (events 222, 322, 422, and 722) or other successful methods, the UE 102 can attempt to change its state from the inactive state to the connected state by sending an RRC Resume Request message to either the MN 104A or MN 104B.

Figure 8:
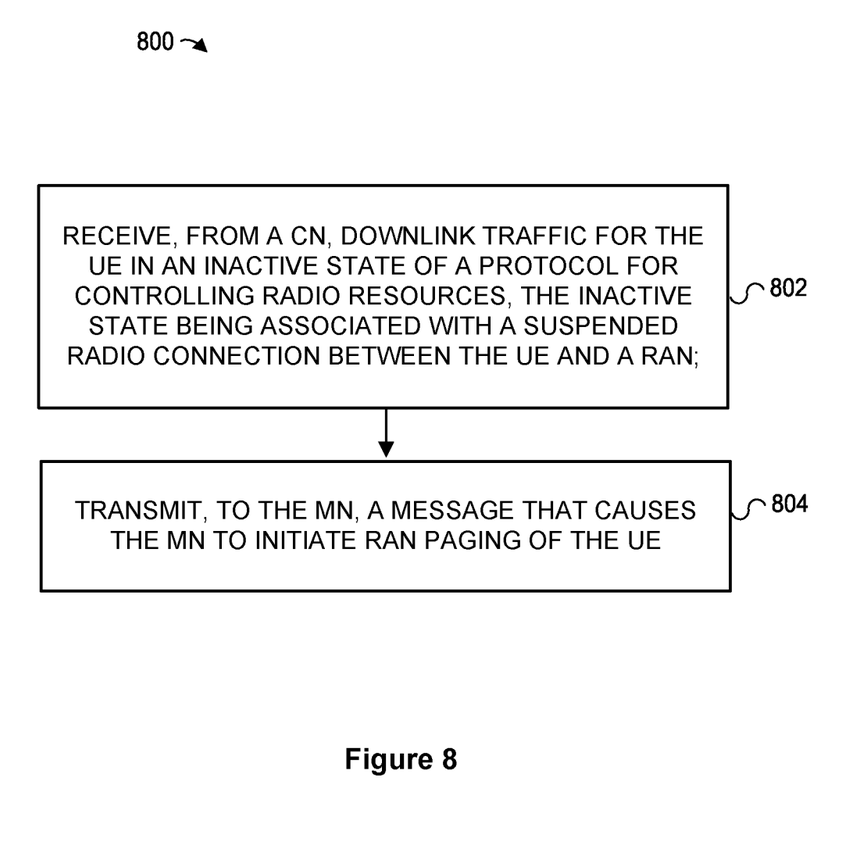
FIG. 8 is a flow diagram of an example method for paging the UE operating in DC and in an inactive state of a protocol for controlling radio resources, which can be implemented in the SN of FIG. 1A or 1B.

FIG. 8 depicts an example method 800 for paging the UE operating in DC and in an inactive state of a protocol for controlling radio resources, which the SN 106A or another suitable base station operating as an SN can implement The method 800 begins at block 802, where an SN receives, from a CN, downlink traffic for the UE in an inactive state of a protocol for controlling radio resources, the inactive state being associated with a suspended radio connection between the UE and a RAN (blocks or events 214, 314, 414, 504, and 714 of FIGS. 2-5 and 7). In response to receiving the downlink traffic, the SN at block 804 transmits, to the MN, a message that causes the MN to initiate RAN paging of the UE (blocks or events 216, 316, 416, 510, and 716 of FIGS. 2-5 and 7).

Figure 9:
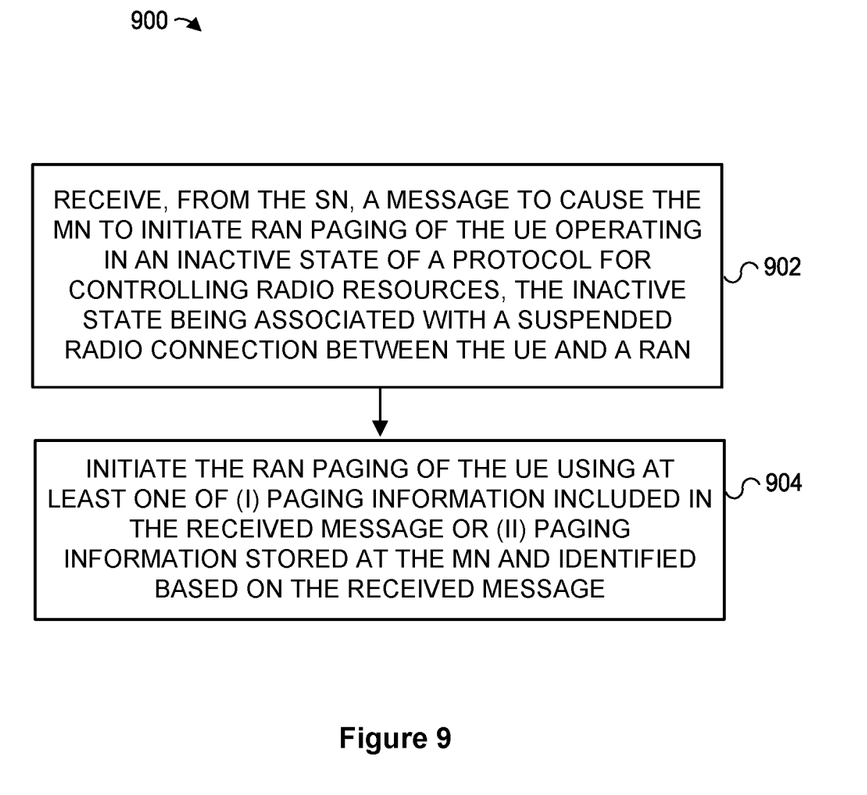
FIG. 9 is a flow diagram of an example method for paging the UE operating in DC and in an inactive state of a protocol for controlling radio resources, which can be implemented in the old MN or new MN of FIG. 1A or FIG. 1B.

FIG. 9 depicts an example method 900 for paging the UE operating in DC and in the inactive state of a protocol for controlling radio resources, which the MN 104A or another suitable base station operating as an MN can implement The method 900 begins at block 902, where an MN receives, from an SN, a message to cause the MN to initiate RAN paging of the UE operating in the inactive state of a protocol for controlling radio resources (blocks or events 216, 316, 416, 602, and 716 of FIGS. 2-4, 6, and 7). The inactive state in this implementation is associated with a suspended radio connection between the UE and a RAN. In response to receiving the message, the MN at block 904 initiates the RAN paging of the UE using at least one of (i) paging information included in the received message or (ii) paging information stored at the MN and identified based on the received message (blocks or events 218, 220, 318, 320, 418, 420, 608, 610, 614, 718 and 720 of FIGS. 2-4 and 6-7).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for paging a UE through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Aspect 1. A method in a secondary node (SN) for requesting a master node (MN) to page a user equipment (UE) operating in dual connectivity (DC) with the MN and the SN, the method comprising: receiving, by processing hardware from a core network (CN), downlink traffic for the UE in an inactive state of a protocol for controlling radio resources, the inactive state being associated with a suspended radio connection between the UE and a radio access network (RAN); and transmitting, by the processing hardware to the MN, a message that causes the MN to initiate RAN paging of the UE.

Aspect 2. The method of aspect 1, further comprising: receiving, by the processing hardware from the MN, paging information for the UE, prior to the MN causing the UE to transition to the inactive state; wherein transmitting the message to the MN includes transmitting a RAN paging message to the MN, the RAN paging message including the paging information for the UE.

Aspect 3. The method of aspect 2, wherein the paging information for the UE includes one or more of: (i) a UE identity index value, (ii) UE RAN Paging Identity, (iii) Paging Discontinuous Reception (DRX), or (iv) RAN paging area.

Aspect 4. The method of aspect 1, wherein transmitting the message to the MN includes transmitting a RAN paging message to the MN, the RAN paging message including an identifier which the MN uses to retrieve paging information for the UE.

Aspect 5. The method of aspect 1, wherein transmitting the message to the MN includes transmitting an Activity Notification message including an indication that the downlink traffic for the UE is re-activated.

Aspect 6. The method of aspect 5, wherein transmitting the Activity Notification message is in response to detecting that the SN has no radio resources configured for the UE.

Aspect 7. The method of aspect 1, wherein transmitting the message to the MN includes transmitting an SN Modification Required message.

Aspect 8. The method of aspect 7, wherein the transmitted SN Modification Required message includes a Paging Required field.

Aspect 9. The method of any of aspects 1-8, wherein receiving the downlink traffic includes data for the UE.

Aspect 10. The method of any of aspects 1-8, wherein receiving the downlink traffic includes signaling for the UE.

Aspect 11. A method in a master node (MN) for paging a user equipment (UE) operating in dual connectivity (DC) with the MN and a secondary node (SN), the method comprising: receiving, by processing hardware from the SN, a message to cause the MN to initiate RAN paging of the UE operating in an inactive state of a protocol for controlling radio resources, the inactive state being associated with a suspended radio connection between the UE and a radio access network (RAN); and initiating, by the processing hardware, the RAN paging of the UE using at least one of (i) paging information included in the received message or (ii) paging information stored at the MN and identified based on the received message.

Aspect 12. The method of aspect 11, further comprising: transmitting, by the processing hardware to the SN, paging information for the UE, prior to causing the UE to transition to the inactive state; wherein receiving the message from the SN includes receiving a RAN paging message, the RAN paging message including the paging information for the UE.

Aspect 13. The method of aspect 12, wherein the paging information for the UE includes one or more of: (i) a UE identity index value, (ii) UE RAN Paging Identity, (iii) Paging Discontinuous Reception (DRX), or (iv) RAN paging area.

Aspect 14. The method of aspect 11, wherein receiving the message from the SN includes receiving a RAN paging message, the RAN paging message including an identifier for the UE; the method further comprising: using the identifier, retrieving paging information for the UE, and initiating the RAN paging procedure using the retrieved paging information for the UE.

Aspect 15. The method of aspect 11, wherein receiving the message from the SN includes receiving an Activity Notification message including an indication that the downlink traffic for the UE is re-activated.

Aspect 16. The method of aspect 15, wherein receiving the Activity Notification message is in response to the SN detecting that no radio resources have been configured for the UE.

Aspect 17. The method of aspect 11, wherein receiving the message from the SN includes receiving an SN Modification Required message.

Aspect 18. The method of aspect 17, wherein the received SN Modification Required message includes a Paging Required field.

Aspect 19. The method of aspect 11, wherein initiating the RAN paging of the UE includes transmitting a paging message to the UE, the paging message including an Inactive Radio Network Temporary Identifier (I-RNTI) to the UE.

Aspect 20. The method of aspect 11, further comprising: determining that a RAN notification area for the UE includes a second base station; and transmitting a paging message to the second base station.

Aspect 21. A base station including processing hardware and configured to implement a method according to any of aspects 1-20.

What is claimed is:

1. A method performed in a secondary node (SN) in a radio access network (RAN) for communicating with a master node (MN), the method comprising:
   receiving, by the SN from a core network (CN), data for a User Equipment (UE) in an inactive state of a protocol for controlling radio resources, the inactive state being associated with a suspended radio connection between the UE and the RAN;
   transmitting, by the SN and to the MN, an activity notification message including a reactivation indication; and
   subsequent to the transmitting of the activity notification message, transmitting, by the SN and to the MN, the data for the UE.

2. A method performed in a master node (MN) for communicating with a user equipment (UE) operating in dual connectivity (DC) with the MN and a secondary node (SN) in a radio access network (RAN), the method comprising:
   receiving, by the MN and from the SN, an activity notification message while the UE operates in an inactive state of a protocol for controlling radio resources, the inactive state being associated with a suspended radio connection between the UE and the RAN, and the activity notification message including a reactivation indication;
   subsequent to the receiving of the activity notification message, receiving, by the MN and from the SN, data for the UE; and
   transmitting, by the MN and to the UE, downlink data when the UE is in a connected state.

3. A base station in a radio access network (RAN) for communicating with a master node (MN), the base station including processing hardware configured to:
   receive, from a core network (CN), data for a User Equipment (UE) in an inactive state of a protocol for controlling radio resources, the inactive state being associated with a suspended radio connection between the UE and the RAN;
   transmit, to the MN, an activity notification message including a reactivation indication; and
   subsequent to the transmission of the activity notification message, transmit, to the MN, the data for the UE.

4. The base station of claim 3, wherein the activity notification message is a second activity notification message, and the base station is further configured to transmit, to the MN and prior to the reception of the data for the UE from the CN, a first activity notification message including an indication that the UE is inactive for receiving user plane data.

5. The base station of claim 3, wherein the transmission of the activity notification message is responsive to the receiving of the data for the UE.

6. A base station in a radio access network (RAN) for communicating with a user equipment (UE) operating in dual connectivity (DC) with a master node (MN) and a secondary node (SN) in the radio access network (RAN), the base station including processing hardware configured to:
   receive, from the SN, an activity notification message while the UE operates in an inactive state of a protocol for controlling radio resources, the inactive state being associated with a suspended radio connection between the UE and the RAN, and the activity notification message including a reactivation indication;
   subsequent to the reception of the activity notification message, receive, from the SN, data for the UE; and
   transmit, to the UE, downlink data when the UE is in a connected state.

7. The method of claim 1, wherein the activity notification message is a second activity notification message, and the method further includes transmitting, by the SN to the MN and prior to the receiving of the data for the UE from the CN, a first activity notification message including an indication that the UE is inactive for receiving user plane data.

8. The method of claim 1, wherein the transmitting of the activity notification message is responsive to the receiving of the data for the UE.

* * * * *